United States Patent [19]

Dawson et al.

[11] 4,345,643
[45] Aug. 24, 1982

[54] HEAT EXCHANGER BASE FOR A PORTABLE LASER SYSTEM

[75] Inventors: Stanley R. Dawson, Corona; Cecil L. Hayes, Placentia, both of Calif.

[73] Assignee: The United States of America as represented by the Secretary of the Army, Washington, D.C.

[21] Appl. No.: 210,068

[22] Filed: Nov. 24, 1980

[51] Int. Cl.³ .............................................. F28F 3/06
[52] U.S. Cl. .................................. 165/122; 165/170; 165/185; 372/36
[58] Field of Search ...................... 165/170, 122, 80 C, 165/80 E, 185; 372/34–36

[56] References Cited

U.S. PATENT DOCUMENTS

| | | | |
|---|---|---|---|
| 1,443,189 | 1/1923 | Malm | 165/170 |
| 2,912,624 | 11/1959 | Wagner | 165/80 C |
| 2,927,250 | 3/1960 | Scharli | 165/80 C |
| 3,216,496 | 11/1965 | Katz | 165/122 X |
| 3,261,397 | 7/1966 | Hay | 165/122 |
| 3,961,666 | 6/1976 | Suzuki et al. | 165/80 C |
| 4,237,521 | 12/1980 | Denker | 165/122 X |

OTHER PUBLICATIONS

Ceramic Honeycombs, Wallace Umphrey, Ceramic Industry, Dec. 1959, pp. 78–79.

*Primary Examiner*—Sheldon J. Richter
*Attorney, Agent, or Firm*—Nathan Edelberg; Jeremiah G. Murray; Anne V. Dougherty

[57] ABSTRACT

A rigid, lightweight, base for a portable laser system, the base including a heat exchanger for dissipating heat conducted thereto from the laser system.

7 Claims, 7 Drawing Figures

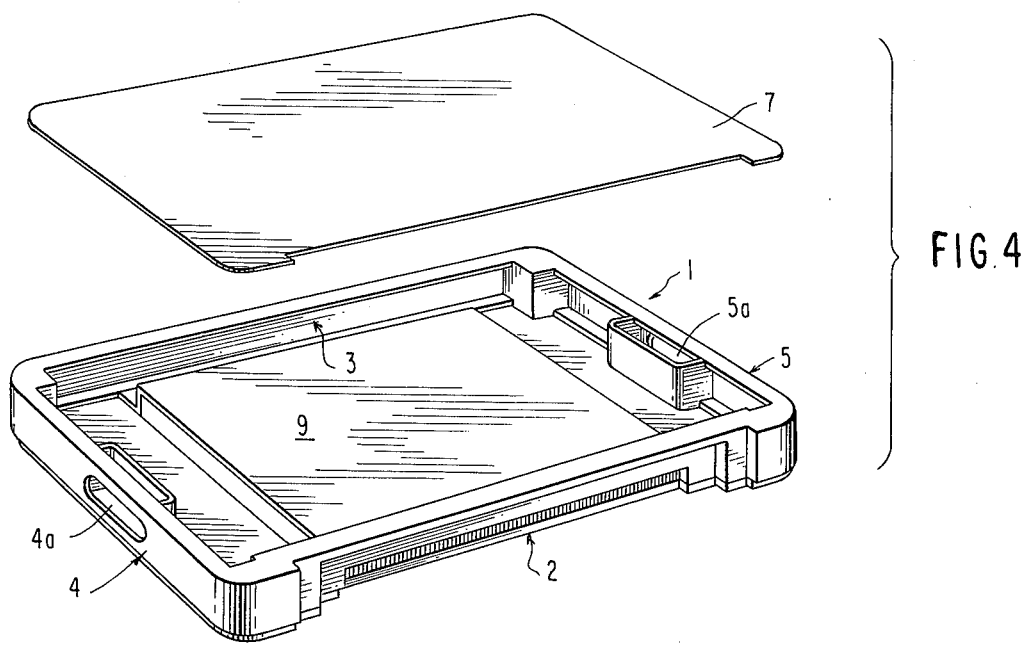
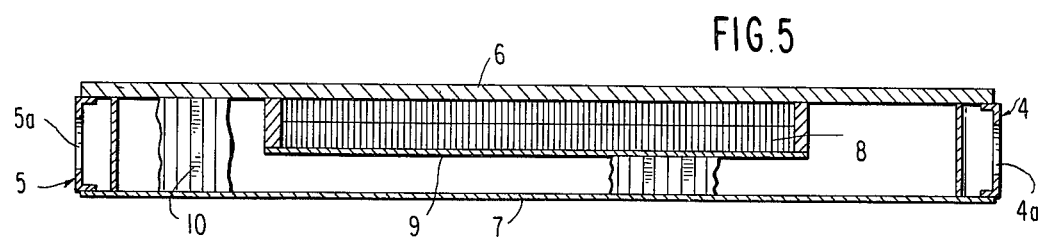
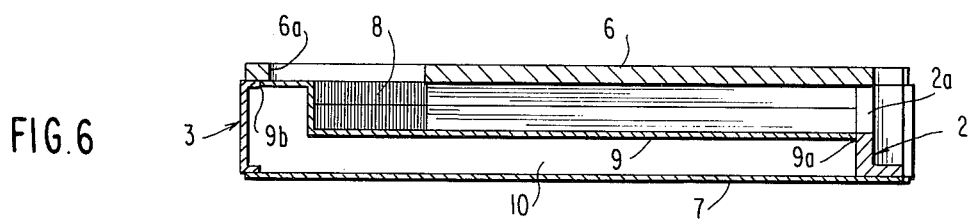
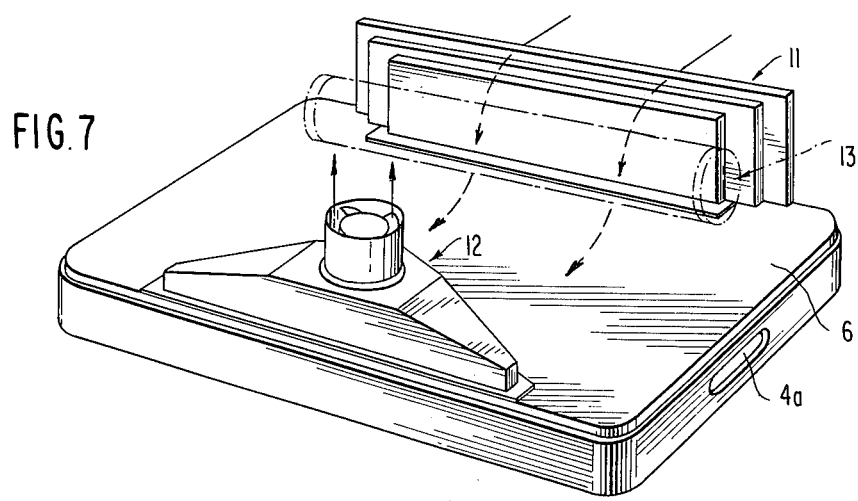

HEAT EXCHANGER BASE FOR A PORTABLE LASER SYSTEM

The invention described herein may be manufactured and used by or for the Government for governmental purposes without the payment of any royalties thereon or therefor.

BACKGROUND OF THE INVENTION

Heretofore, portable laser systems designed for field use have required massive structural bases to provide the necessary rigidity to maintain the optical alignment of the laser system while in use. Furthermore, high power laser sources required cooling provided by a heat exchanger using water as the thermal transfer medium. The additional weight caused by the massive structural base and the additional components required by the water coolant heat exchanger greatly reduced the portability of the laser system.

To overcome the above-noted problems experienced with portable laser systems, the base of the present invention has been devised to enhance the portability of laser systems and comprises, essentially, a lightweight, low profile, aluminum base having an air coolant heat exchanger contained therein.

BRIEF DESCRIPTION OF THE DRAWINGS

FIG. 4 is a front perspective view of the base having the bottom plate removed therefrom;

FIG. 5 is a sectional side elevational view of the base, taken along line 5—5 of FIG. 1;

FIG. 6 is a sectional end elevational view of the base, taken along line 6—6 of FIG. 1; and FIG. 7 is a back perspective view of the base showing the fan and air inlet filter mounted on the top of the base.

DESCRIPTION OF THE PREFERRED EMBODIMENT

Figure 1:
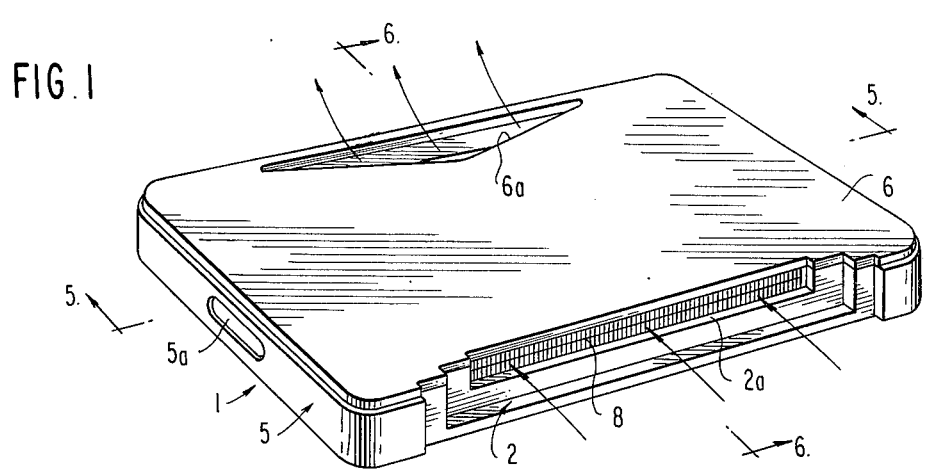
FIG. 1 is a front perspective view of the base of the present invention.

Referring to the drawings and more particularly to FIGS. 1 and 4 thereof, the base of the present invention comprises a substantially rectangular aluminum frame 1 having a front wall 2, a back wall 3, and end walls 4 and 5. A ⅜" hardened aluminum plate 6, surfaced to a flatness specification of ±0.30", is secured to the top edge of the frame 1 to provide a top wall for supporting a conventional laser system. A 1/6" aluminum plate 7 is secured to the bottom edge of the frame to provide a bottom wall for the base. The front wall 2 of the frame is cut-out as at 2a to form an air inlet, and the top wall 6 is cut-out as at 6a to provide an air outlet. A radiator provided by a plurality of transversely extending, heat dissipating, fins 8 is disposed within the base and extends from the air inlet 2a to the air outlet 6a, as shown in FIGS. 1 and 2.

The details of the construction of the interior of the base are shown in FIGS. 5 and 6 wherein it will be seen that the fins 8 are supported by a shelf 9 having its front edge secured to the front wall 2 of the frame as at 9a, and its rear edge secured to the frame rear wall as at 9b. The top wall 6 of the base engages the top edges of the fins 8 whereby heat from the laser system is conducted through the plate 6 to the fins. The shelf 9 is spaced inwardly from the frame end walls 4 and 5 and above the base bottom wall 7, the space therebetween being provided with a honeycomb structure 10 to thereby enhance the rigidity of the base.

Figure 2:
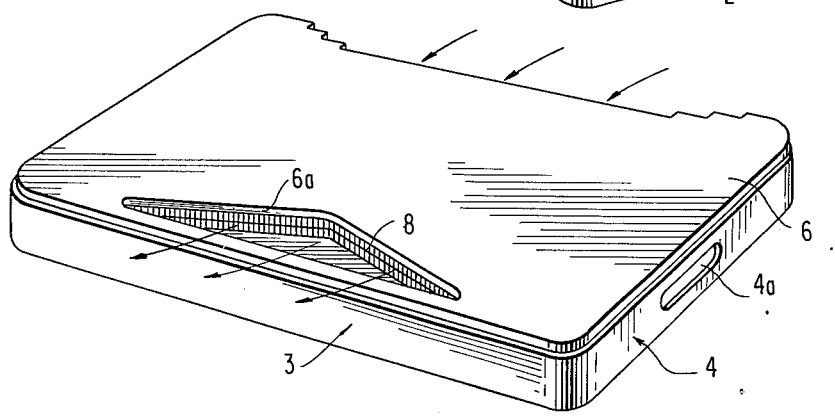
FIG. 2 is a back perspective view of the base of the present invention.
Figure 3:
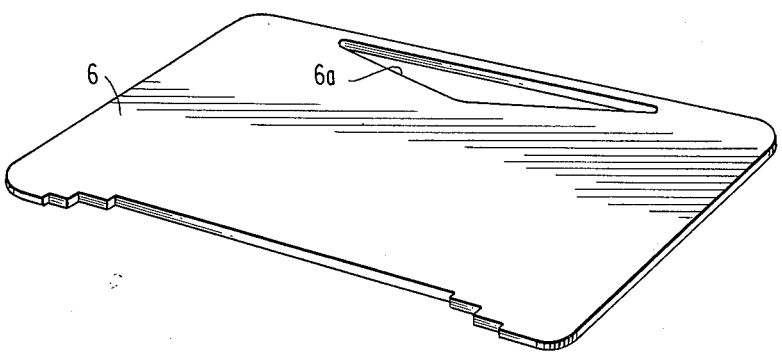
FIG. 3 is a front perspective view of the base having the top plate removed therefrom.
Figure 3:
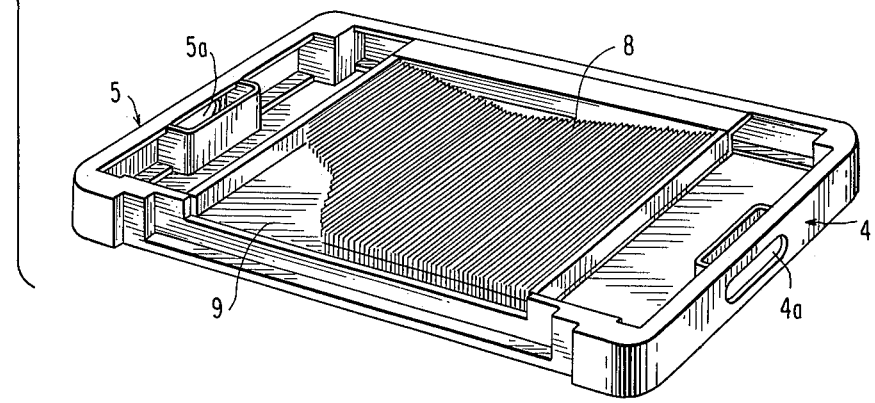

To complete the structure of the base, as will be seen in FIG. 7, a filter assembly 11 is mounted on the frame front wall at the air inlet and a fan 12 is mounted on the top wall 6 at the air outlet thereof, whereby air is drawn through the base as shown by the arrows in FIGS. 1, 2 and 7, to thereby dissipate the heat conducted from the laser system 13 through the top plate 6 to the fins 8. To facilitate the carrying of the base, hand holes 4a and 5a are provided in the end walls 4 and 5, respectively.

From the above description, it will be appreciated by those skilled in the art that the lightweight heat exchanger base of the present invention being constructed of aluminum, reinforced with a honeycomb core, and having a top surfaced to a specified flatness, provides a base having the necessary rigidity to maintain the optical alignment of the laser system while in use, and by employing an air heat exchanger as an integral part of the base, the portability of the laser system is thereby enhanced.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A heat exchanger base for electrical apparatus comprising, a frame having contiguous front, back and end walls;

a plate secured to the upper edge of said frame forming a top wall for supporting electrical apparatus;

a bottom plate secured to the lower edge of said frame;

radiator means including a shelf mounted within said frame between and extending substantially parallel to the top and bottom plates and a plurality of like heat-radiating fins supported on said shelf and extending between said front and backwalls, the bottom surface of said top plate engaging the top edges of said fins; and air inlet and outlet means provided in said base communicating with respective opposite front and back portions of said radiator means for causing heat generated by the apparatus to be conducted through the top wall and dissipated through said radiator means.

2. A heat exchanger base according to claim 1, wherein a honeycomb structure is mounted within the frame between the end walls and top and bottom walls to enhance the rigidity of the base.

3. A heat exchanger base according to claim 1, wherein the air inlet means comprises a cut-out portion in the front wall of the frame adjacent the front portion of the radiator means.

4. A heat exchanger base according to claim 3, wherein a filter assembly is mounted on the air inlet means.

5. A heat exchanger base according to claim 3, wherein the air outlet means comprises a cut-out portion in the top wall adjacent the back portion of the radiator means.

6. A heat exchanger base according to claim 5, wherein fan means are mounted on the air outlet means to thereby draw air through the air inlet means and radiator means.

7. A heat exchanger base according to claim 6 wherein said apparatus is a laser system.

* * * * *